3,337,473
HYDROGENATION AND HYDROGENOLYSIS
CATALYST FOR CHROMATOGRAPHIC DE-
TERMINATION OF CARBON SKELETON OF
ORGANIC COMPOUNDS
Morton Beroza, 821 Malta Lane,
Silver Spring, Md. 20901
No Drawing. Original application Oct. 29, 1962, Ser. No. 233,979, now Patent No. 3,230,046, dated Jan. 18, 1966. Divided and this application June 3, 1963, Ser. No. 292,181
4 Claims. (Cl. 252—442)

This application is a division of Ser. No. 233,979, filed Oct. 29, 1962, now United States Patent No. 3,230,046.

A non-exclusive, irrevocable, royalty-free license in the invention herein described, throughout the world for all purposes of the United States Government, with the power to grant sub-licenses for such purposes, is hereby granted to the Government of the United States of America.

This invention relates to a new apparatus and method that can be used to identify rapidly in microgram amounts the carbon skeleton and other structural features of a wide variety of organic compounds.

It has been shown that sulfur, nitrogen, oxygen and halogen atoms are cleaved from carbon atoms and are replaced with hydrogen atoms and unsaturated bonds are saturated in a special apparatus consisting of an aluminum reaction tube packed with a catalyst, a furnace for maintaining the tube at the desired temperature, a motor-driven syringe for charging quantities of pure compounds at about 1 μl. per minute, and a stainless-steel tube cooled in liquid nitrogen or Dry Ice. See Thompson et al., Analytical Chemistry, vol. 32, pages 424–430, 1762–1765, and vol. 34, pages 151–156 (1962). The trapped hydrocarbon is taken up in a minimum amount of solvent and determined by gas chromatography. The solvent, which masks part of the elution pattern, is selected to avoid interference with the products of the chromatography.

An object of the present invention is to provide novel catalysts for use with the apparatus and procedures described in the above-mentioned United States Patent No. 3,230,046.

In accordance with the present invention three types of catalyst, designated as acid, neutral, and alkaline, are provided, as follows:

(A) *Acid.*—A solution of palladium chloride in 5% aqueous acetic acid or platinic chloride in water (or other metal salt in solution) is evaporated to dryness in contact with a 60- to 80-mesh catalyst support on a Rinco rotating evaporator or by stirring in a beaker and then dried at 110° C. The dried powder is packed in the aluminum tube, thus providing a minimum of dead space, and hydrogen gas passed slowly through the tube (not attached to the chromatographic column) for 30 minutes while the tube is maintained at 125° C. and for 30 minutes at 200° C. The hydrogen should be vented into a hood. For analytical purposes catalysts were used for 2 days and then replaced regardless of amount of usage. Catalysts were usually made up to contain from 1 to 5% palladium or platinum chloride (as the metal) on the support [e.g., porous glass, acid-washed diatomaceous earth, alumina].

(B) *Neutral.*—Sufficient fixed (nonvolatile) alkali (e.g., sodium or potassium hydroxide or carbonate) to neutralize the anion of the metallic salt is added to the mixture of the metallic salt solution and the support. For example, to 88.8 mg. of $PdCl_2$ add 40 mg. of sodium hydroxide. The product is then evaporated and processed as described above under A.

(C) *Alkaline.*—The catalyst is prepared as described above under B except that an excess of fixed alkali (usually a 0.2% excess based on the weight of the support) is added.

The alkaline and especially the neutral catalyst give results that, in general, are much superior to those obtained with the acid catalyst. The improved catalysts give less tailing of peaks, permit analysis of amines and amides, and give products with compounds of higher molecular weight. To illustrate the latter point undecyl iodide gives undecane with neutral 1% palladium on acid-washed diatomaceous earth but no product comes through with the same catalyst if it is the acid type. Another example is tetradecanol, which gives tridecane on neutral palladium catalyst.

The preparation and use of palladium and platinum salts are meant to be illustrative rather than limiting. It is assumed the catalyst support used in the above preparations is neutral. Furthermore, as will immediately be obvious to those skilled in the art of gas chromatography, the catalyst support must be nonadsorptive to insure accurate or meaningful results.

In using the catalyst in the apparatus and method of Patent No. 3,230,046, the catalyst tube therein described is maintained at a definite temperature (usually between 125° and 290° C.). The chromatographic column is held at 25° C. and the hydrogen flow rate at 20 ml. per minute.

Having described my invention, I claim:

1. A method of preparing a hydrogenation and hydrogenolysis catalyst for use in the chromatographic determination of carbon skeleton, said method consisting of:
    (a) wetting a nonadsorptive support selected from the group consisting of porous glass, diatomaceous earth, and alumina, having a uniform particle size at least as fine as 60 to 80 mesh, with a solution of a salt selected from the group consisting of palladium chloride and platinic chloride;
    (b) adding a nonvolatile alkali selected from the group consisting of an inorganic alkali metal salt and hydroxide in an amount at least stoichiometric with the amount of chloride ion present; and
    (c) activating the catalyst by heating at a temperature of 125°–300° C. in the presence of hydrogen.

2. A method of preparing a hydrogenation and hydrogenolysis catalyst for use in the chromatographic determination of carbon skeleton, said method consisting of:
    (a) wetting a nonadsorptive support selected from the group consisting of porous glass, diatomaceous earth, and alumina, having a uniform particle size at least as fine as 60 to 80 mesh, with an acetic acid solution of palladium chloride;
    (b) adding a nonvolatile alkali selected from the group consisting of an inorganic alkali metal salt and hydroxide in an amount at least stoichiometric with the amount of chloride ion present;
    (c) drying the support; and
    (d) activating the catalyst by heating at a temperature of 125°–300° C. in the presence of hydrogen.

3. A method of preparing a hydrogenation and hydrogenolysis catalyst for use in the chromatographic determination of carbon skeleton, said method consisting of:
    (a) wetting a nonadsorptive support selected from the group consisting of porous glass, diatomaceous earth, and alumina, having a uniform particle size at least as fine as 60 to 80 mesh, with an aqueous solution of platinic chloride;
    (b) adding a nonvolatile alkali selected from the group consisting of an inorganic alkali metal salt and hydroxide in an amount at least stoichiometric with the amount of chloride ion present;
    (c) drying the support; and
    (d) activating the catalyst by heating at a temperature of 125°–300° C. in the presence of hydrogen.

4. A hydrogenation and hydrogeneolysis catalyst comprising a nonadsorptive support having a uniform particle size at least as fine as 60 to 80 mesh, said support being selected from the group consisting of porous glass, diatomaceous earth, and alumina, and on said support a salt selected from the group consisting of palladium chloride and platinic chloride and a fixed, nonvolatile alkali selected from the group consisting of an alkali metal salt and hydroxide in an amount at least stoichiometric with the amount of chloride ion present, said catalyst having been activated by heating at a temperature of 125°–300° C. in the presence of hydrogen.

References Cited

UNITED STATES PATENTS

| | | | |
|---|---|---|---|
| 2,013,066 | 9/1935 | Porter | 252—441 X |
| 2,623,860 | 12/1952 | Haensel | 252—441 |
| 2,642,385 | 6/1953 | Berger et al. | |
| 2,892,799 | 6/1959 | Brennan et al. | 252—442 |
| 2,917,466 | 12/1959 | Tamele et al. | 252—442 X |
| 2,943,129 | 6/1960 | Miller et al. | 252—441 X |
| 2,965,453 | 12/1960 | Harlan et al. | 252—441 X |
| 2,982,789 | 5/1961 | Smith et al. | 252—441 X |
| 2,982,803 | 5/1961 | Folkins et al. | 252—441 X |
| 3,066,176 | 11/1962 | Schwarzenbek et al. | 252—441 X |
| 3,106,590 | 10/1963 | Bittner | 252—441 X |
| 3,123,573 | 3/1964 | Carr | 252—441 X |

DANIEL E. WYMAN, *Primary Examiner.*

OSCAR R. VERTIZ, *Examiner.*

E. STERN, L. G. XIARHOS, *Assistant Examiners.*